United States Patent
Busse et al.

(10) Patent No.: US 7,242,835 B2
(45) Date of Patent: Jul. 10, 2007

(54) OPTICAL FIBER CLAD-PROTECTIVE TERMINATIONS

(75) Inventors: Lynda Busse, Alexandria, VA (US); Frederic H. Kung, Alexandria, VA (US); Jasbinder Sanghera, Ashburn, VA (US); Ishwar Aggarwal, Fairfax Station, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 11/185,082

(22) Filed: Jul. 18, 2005

(65) Prior Publication Data

US 2007/0014528 A1   Jan. 18, 2007

(51) Int. Cl.
*G02B 6/38* (2006.01)
*G02B 6/02* (2006.01)
*G02B 6/00* (2006.01)
*G02B 6/32* (2006.01)

(52) U.S. Cl. .................. 385/125; 385/78; 385/139

(58) Field of Classification Search ........ 385/125–127, 385/60–62, 72, 76–81
See application file for complete search history.

(56) References Cited

U.S. PATENT DOCUMENTS

| | | | |
|---|---|---|---|
| 5,737,471 A * | 4/1998 | Sugiyama et al. | 385/123 |
| 6,334,017 B1 * | 12/2001 | West | 385/123 |
| 6,364,538 B1 * | 4/2002 | Ishiharada et al. | 385/78 |
| 6,404,966 B1 * | 6/2002 | Kawanishi et al. | 385/125 |
| 6,526,209 B1 * | 2/2003 | Hasegawa et al. | 385/127 |
| 6,608,955 B2 * | 8/2003 | Fukuda et al. | 385/125 |
| 6,661,954 B2 | 12/2003 | Sasaoka et al. | |
| 6,826,342 B1 * | 11/2004 | Bise et al. | 385/125 |
| 6,827,500 B2 * | 12/2004 | Basavanhally et al. | 385/80 |
| 6,901,197 B2 * | 5/2005 | Hasegawa et al. | 385/125 |
| 2001/0028775 A1 * | 10/2001 | Hasegawa et al. | 385/127 |
| 2002/0159734 A1 | 10/2002 | Sasaoka et al. | |
| 2003/0068150 A1 | 4/2003 | Ariel et al. | |
| 2004/0052485 A1 | 3/2004 | Van Eijkelenborg et al. | |
| 2005/0025965 A1 * | 2/2005 | Sanghera et al. | 428/364 |
| 2005/0074215 A1 * | 4/2005 | Sanghera et al. | 385/125 |
| 2005/0111804 A1 * | 5/2005 | Bjarklev et al. | 385/125 |

* cited by examiner

*Primary Examiner*—Michelle Connelly-Cushwa
*Assistant Examiner*—Rhonda S. Peace
(74) *Attorney, Agent, or Firm*—Aisha Ahmad; John J. Karasek

(57) ABSTRACT

This invention pertains to fiber termination combination which includes an optical fiber having a fiber core for transmitting a highly energetic optical signal that can damage the fiber and a structured region around the core for directing the optical signal into the core, the structured region being characterized by multiple channels of smaller internal diameter than the core defined by thin walls disposed around said core; a ferrule, with an opening therein for locating said fiber, at the end of said fiber enveloping said fiber extremity which cooperates with said blocking structure to block the optical signal from impinging on said microstructured region of said fiber; and a blocking structure disposed over the end of said fiber with an opening mating with said fiber core, said blocking structure blocking the optical signal from impinging on said microstructured region of said fiber.

22 Claims, 4 Drawing Sheets

OPTICAL FIBER CLAD-PROTECTIVE TERMINATIONS

BACKGROUND OF THE INVENTION

1. Field of the Invention

This invention pertains to the optical fiber terminations whereby damage to the fiber, and particularly to the microstructured region thereof containing channels separated by thin walls, is eliminated and/or reduced.

2. Description of Related Art

In developing the hollow core photonic band gap fibers for various applications, the most important of which is for transmission of ultra-high laser power in the infrared, on the order of tens of giga watts per square centimeter, the fibers are intended for implementation in missile warning protection systems for military and commercial aircraft. The fibers can also be used in laser surgery with optical beams at various wavelengths, including wavelengths of 2.94 μm and 10.6 μm. These fibers typically consist of a hollow, air-filled core and a microstructured cladding surrounded by a solid glass jacket for mechanical strength as shown in FIG. 1. The microstructured cladding typically consists of multiple channels or veins around the core which are separated from each other by webbing or walls, the thickness of which is on the order of a few hundred nanometers. Air fill fraction of the microstructured region is up to about 90%, i.e., air to glass ratio. Although over 99% of the light is predicted to propagate in the fiber core, where a laser beam can be focused into, there is always a risk of laser misalignment or beam shift due to temperature or environmental changes. If the beam impinges on the microstructured region, damage or complete destruction usually occurs whereby the fiber is ablated or otherwise damaged and cannot be used for optical transmission.

Hollow core silica fibers with a structured region providing a photonic band gap have been known since about 1999. Photonic band gap fibers have recently been demonstrated using silica glass with a minimum loss of about 1-7 dB/km at 1.5 μm. It would be obvious to use hollow core photonic band gap silica fiber to transmit wavelengths longer than 1.5 μm since it was believed that the light was guided in the hollow core. However, it turns out that hollow core photonic bandgap silica fibers do not transmit well beyond 2 μm since up to several percent of the light can propagate in the microstructured region and this light is highly attenuated through multiphonon absorption in silica. Hence, it is not possible to use silica photonic bandgap fibers for high power transmission in the infrared region beyond a wavelength of about 2 μm.

OBJECTS AND BRIEF SUMMARY OF THE INVENTION

It is an object of this invention to provide a termination structure which blocks an input laser beam from impinging on the microstructured region and imparting damage thereto.

Another object of this invention is to provide means to block errant optical rays so that a high power density optical beam can be transported through a core of a fiber containing a microstructured region.

Another object of this invention is to make a fiber termination structure multifunctional in that it can be used to protect hollow core and solid core fiber, and the like.

Another object of this invention is to make a fiber termination structure cheaper, more durable and readily connectable to hardware, such as other optical fibers and optical systems.

DETAILED DESCRIPTION OF THE INVENTION

This invention pertains to an optical fiber termination structure to eliminate and/or reduce damage to an optical fiber, including a region of the fiber containing multiple longitudinal channels separated from each other by thin walls, as thin as on the order of 150 nanometers, the channels surrounding a fiber core. The core can be hollow or solid and the purpose of the channels is to confine the optical signal to the core region.

The optical fiber material can be any material that the fiber can be made of including, but not limited to, glass, plastic and metal or alloy. In a preferred embodiment, the material is a chalcogenide glass. The core of the fiber can be solid but is typically hollow, filled with air or some gas, at higher than atmospheric or at atmospheric pressure, or it can be a vacuum. Laser induced damage threshold for air at 1 μm wavelength in a hollow core has been reported to have maximum measured intensity of about $10^{14}$ watts/cm$^2$ at a low (e.g. 10 Torr) pressure and a measured intensity of about $10^{13}$ watts/cm$^2$ at atmospheric pressure (760 Torr). Extrapolation of the curve of this data to a low pressure typical of a moderate vacuum of 10 milliTorr shows a damage threshold of about $10^{17}$ watts/cm$^2$. Therefore, a chalcogenide photonic band gap fiber which has the microstructured region of multiple channels around the hollow core of the chalcogenide optical fiber would have very high damage threshold.

Although estimated theoretical damage threshold is about 6 GW/cm$^2$ for chalcogenide glass, for a 1 micron wavelength optical signal, it is 30 GW/cm$^2$ for silica glass, it should be remembered that chalcogen glass can transmit in the infrared wavelength region of about 2-12 microns whereas silica glass transmits at wavelengths of only up to about 2 microns. Since the walls of the channels are thin, of whatever material they may be, high laser power may cause damage, be it in the form of melting, carbonization, gasification, cracking, ablation or any other damage due to overheating or the like.

Figure 1A:
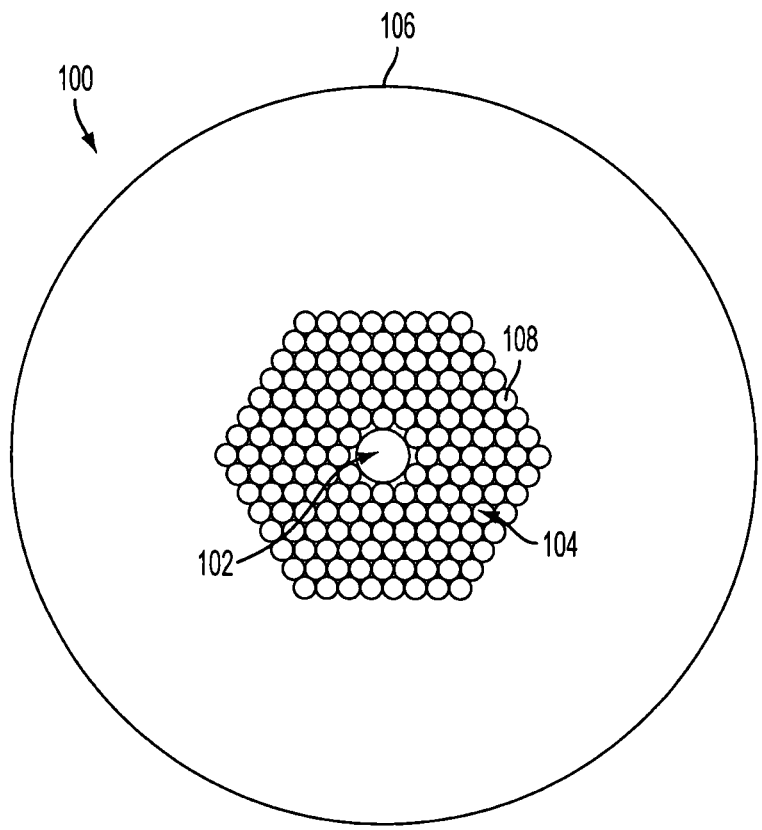
FIG. 1 is a top view and cross-sectional view of a prior art hollow core photonic bandgap optical fiber.
Figure 1B:
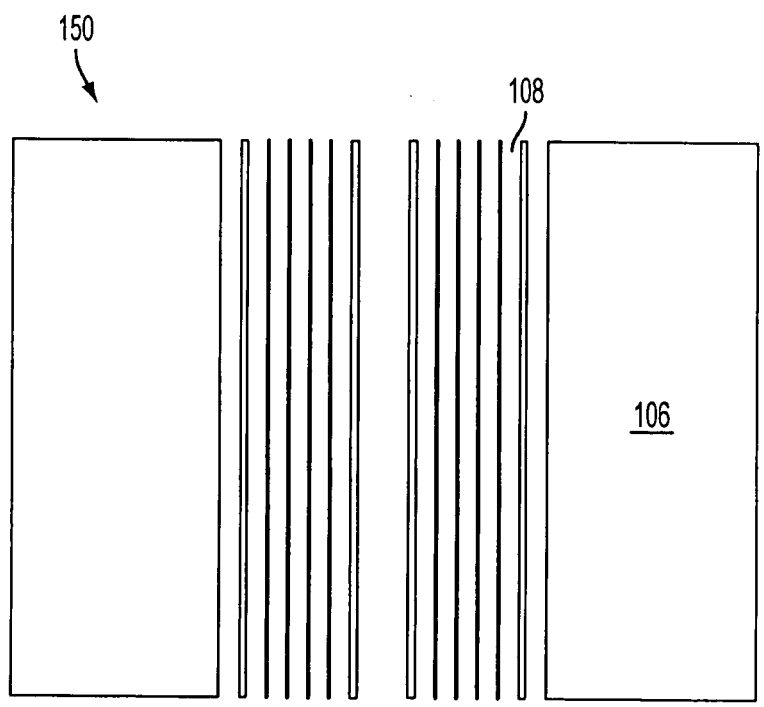

An illustration of a typical hollow core photonic band gap infrared fiber in cross-section is shown in FIG. 1 where the fiber 100 includes hollow core 102, microstructured region in hexagonal or honeycomb or any other shape 104, and circumferential region 106. The fiber is typically made from a chalcogenide glass but can also be made from chalcohalide glasses and other infrared transmitting glasses, such as halides, germanates and tellurites. The fiber 100 is typically circular in cross-section although it can be of any other shape and its outside diameter is typically in the range of 80-1000 µm. Hollow core 102 can be hexagonal in cross-sectional shape, circular or any other shape, although, typically, it is circular. The hollow core diameter is typically from 1 µm to several 100s µm, more typically 2-200 µm. Openings or channels 108 in the microstructured region 104 are typically circular in cross-section although they can be of any other shape. The diameter of the openings are typically from a fraction of a micron to about 10 µm in diameter with a center-to-center spacing or periodicity that is believed to be about 1-25 µm, more typically 1-12 µm. In the microstructured region of the fiber, air fill fraction is 30-99%, preferably 40-70%. The purpose of the openings is to create the photonic band gap which channels light into the hollow core. In absence of the microstructured region, which imparts photonic band gap to the fiber, the light passing through the hollow core would be scattered or lost and the fiber would not be functional for the intended purpose. It is believed that at least three courses i.e., circumferential layers around the center hollow core 102, of the openings disposed in a particular arrangement are needed to create the photonic band. The arrangement of the openings can be in hexagonal or honeycomb structure or in any other periodic or non-periodic way that produces the photonic bandgap. Openings 108 are typically arranged in hexagonal pattern and typically there are 4-5 courses of the openings in the microstructured region 104 disposed concentrically around the hollow core 102 although, there may be fewer than four or more than four courses.

Thickness of the solid region 106 is typically 5-500 µm, and more typically 50-300 µm, although it will depend on the glass composition and other parameters to provide physical integrity to the microstructured region 104. Thickness of the microstructured region is 5-500 µm, preferably 20-300 µm.

Glass fiber 100 in FIG. 1 is typically made of chalcogenide glass, which is a vitreous material composed of the chalcogen elements of Group VI of the Periodic Table. These elements are usually mixed with elements of Groups IV and V to form the familiar compound glasses. More particularly, chalcogenide glasses are made from mixtures containing at least one of sulfur, selenium, and tellurium. Other elements can be added. Examples of other elements that can be combined with at least one chalcogen element include germanium, arsenic and antimony.

Chalcogenide glass typically contains at least about 25 mole percent, and generally at least 50 mole percent, of one or more of the three chalcogen elements. The presence of tellurium in the glass composition has been found to increase the wavelength of transmission in the infrared region. While sulfide fibers, such as $As_2S_3$, transmit from about 1-6 µm, the transmission window is increased to beyond 10 µm by including the heavier chalcogenide elements selenium and tellurium. Glasses containing high levels of tellurium typically transmit in the 3-12 µm region.

The use of chalcogenide fibers is advantageous not only for wide transmittance range but also for chemical durability. Although chalcogenide glass cannot be used in strongly basic environments because it undergoes chemical attack, there are numerous environments where chalcogenide fibers can be used. For instance, chalcogenide glass does not react with water, unlike fluoride glass, and can, therefore, be used in aqueous non-basic environments. Additionally, chalcogenide glass can be used in acidic and organic environments.

The fiber of this invention can also be made from mixtures of halide and chalcogenide glass components. Halide glasses, such as ZBLAN (53 $ZrF_6$-20 $BaF_2$-4$LaF_3$-3 $AlF_3$-20 NaF by mole percent), have relatively poor chemical durability and low glass transition temperatures, especially the other non-fluoride halide glasses, whereas chalcogenide glasses are well known for their chemical durability but their relatively high refractive indices give rise to high reflectivities from the glass surface. Chalcohalides contain both halides and chalcogens and have some beneficial characteristics of both glasses. The structural aspect of these glasses is interesting from a fundamental viewpoint since chalcogenide glasses are predominantly covalent and halide glasses are predominantly ionic in character. As used herein, the term "chalcogenide" includes "chalcohalide."

The photonic bandgap hollow fibers can have a polymeric material cladding, or a cladding of any other material, on the outside of the fiber 100, although such cladding is not required. The cladding is provided on the fiber to facilitate handling thereof. The cladding material can be hydrophobic or hydrophilic, typically it is hydrophobic for obvious reasons. Some hydrophobic polymeric materials in an aqueous environment containing a hydrophobic analyte will repel water but will preferably solubilize the hydrophobic analyte. Specific examples of the polymeric materials include low density polyethylene and polydimethylsiloxane. There are other polymeric materials which do not allow species to penetrate them.

The periodic layered structure of holes and glass in the microstructured region of the hollow core fiber of this invention, shown in cross-section in FIG. 1, creates a photonic band gap that prevents light from propagating in the microstructured region, analogous to a 2 D grating, and so light is confined to the hollow core. Typically, the periodicity of the holes is on the scale of the wavelength of light and the outer glass or the circumferential glass region is used for providing mechanical integrity to the fiber. The fact that light travels in the hollow core also means that the losses will be lower so longer path lengths can be used. Since light is guided in the hollow core, an analyte disposed therein will have maximum interaction with light, unlike the prior art evanescent sensors.

Before proceeding with a number of embodiments of the fiber termination structures of this invention it should be understood, as already disclosed, that the termination structures can be used to make connections with other fibers and systems, although such termination structures are typically used to make connections with systems by merely plugging into standard and non-standard fiber adapters, fiber mating sleeves, fiber connecters and any other pertinent hardware. Use of standard optical fiber connector types including SMA, FC and ST type connecters, which can be ceramic or metallic, is desired.

Unlike many standard optical fiber terminations, the hollow core photonic band gap and photonic crystal fiber types of fibers should not be polished during their termination procedures, but the ends are cleaved instead. They cannot be polished because of contamination that would fill the microstructured regions with either glass or polishing material, potentially causing disruption of signal guidance within the fiber. All of the terminations described herein are entirely compatible and designed for cleaved fibers to be inserted into the termination structures with fiber optic epoxy, or something similar, coating the outside of the fiber a short distance from the fiber tip to affix the fiber inside the structure.

Figure 2:
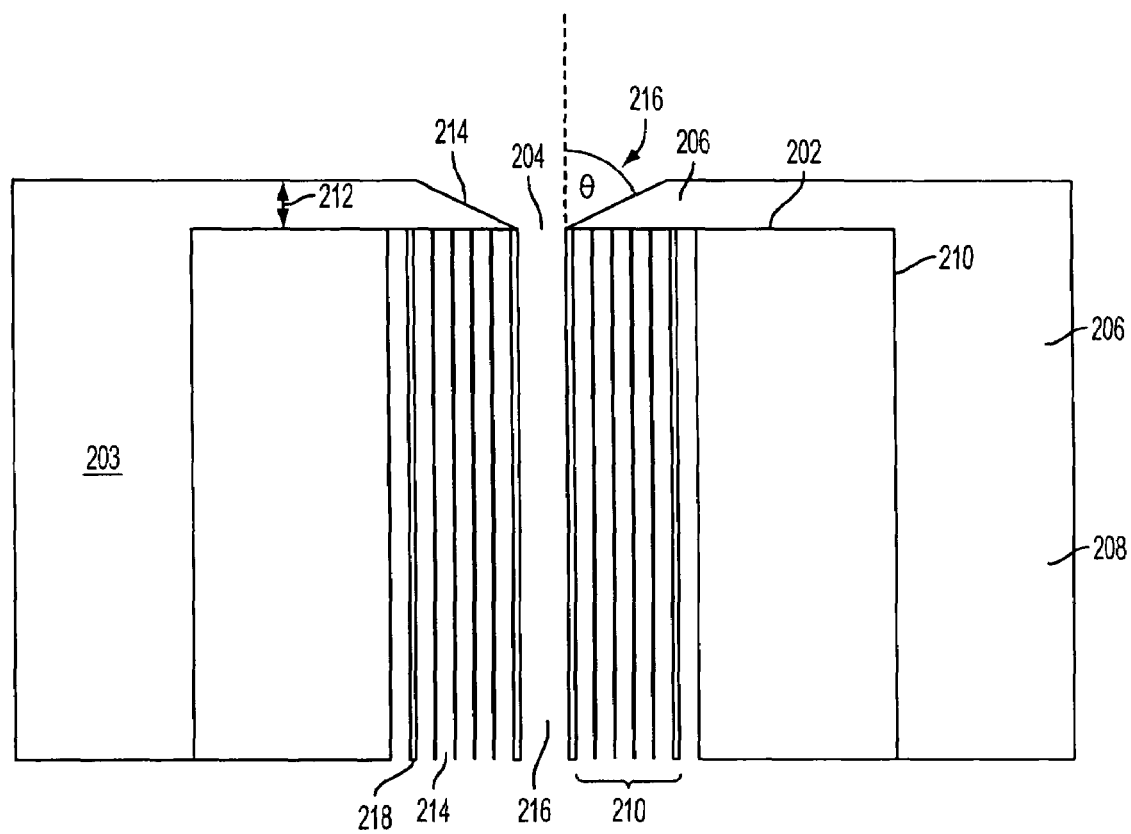
FIG. 2 is a cross-sectional view of a hollow core photonic band gap optical fiber with a termination ferrule surrounding the end of the fiber.

The fiber termination structure shown schematically in FIG. 2 employs a type of ferrule that is not commercially available. The termination structure in FIG. 2 includes a ferrule 203 whose inner channel diameter matches the outer diameter of fiber 202 but whose output core end tip 204 is restricted in diameter to match the core size of the fiber. As shown in FIG. 2, which is a cross-sectional view of the fiber, ferrule 203 has an upper portion 206 which extends the longitudinal portion 208 of the ferrule and covers the microstructured region 210 of the fiber so that it is protected from incident light. Opening in the ferrule and the core fiber match, however, thickness 212 is beveled, as at 214, to allow the divergence of the incoming optical signal, such as a laser beam, to be appropriately matched to the numerical aperture of the fiber.

Bevel surface 214 reflects any light rays impinging on the surface away from the core. The bevel angle is provided so that the acceptance angle, which is typically more than twice the bevel angle $\theta$, is sufficient to allow incoming light to couple into the fiber core. For example, for a fiber with numerical aperture of 0.2, the bevel angle $\theta$ is considerably larger than 12°. The structured region 210 is characterized by a plurality of openings 214 arranged, typically in courses, around the fiber core 216. The opening or channel internal diameter is typically smaller than that of the fiber core, which is typically centrally disposed within the fiber. Openings 214 are defined by thin walls 218, which can be on the order of 100 nanometers thick for a chalcogenide glass. It is believed that it is the impact of highly energetic optical rays that lends to the damage in the microstructured region.

Figure 3:
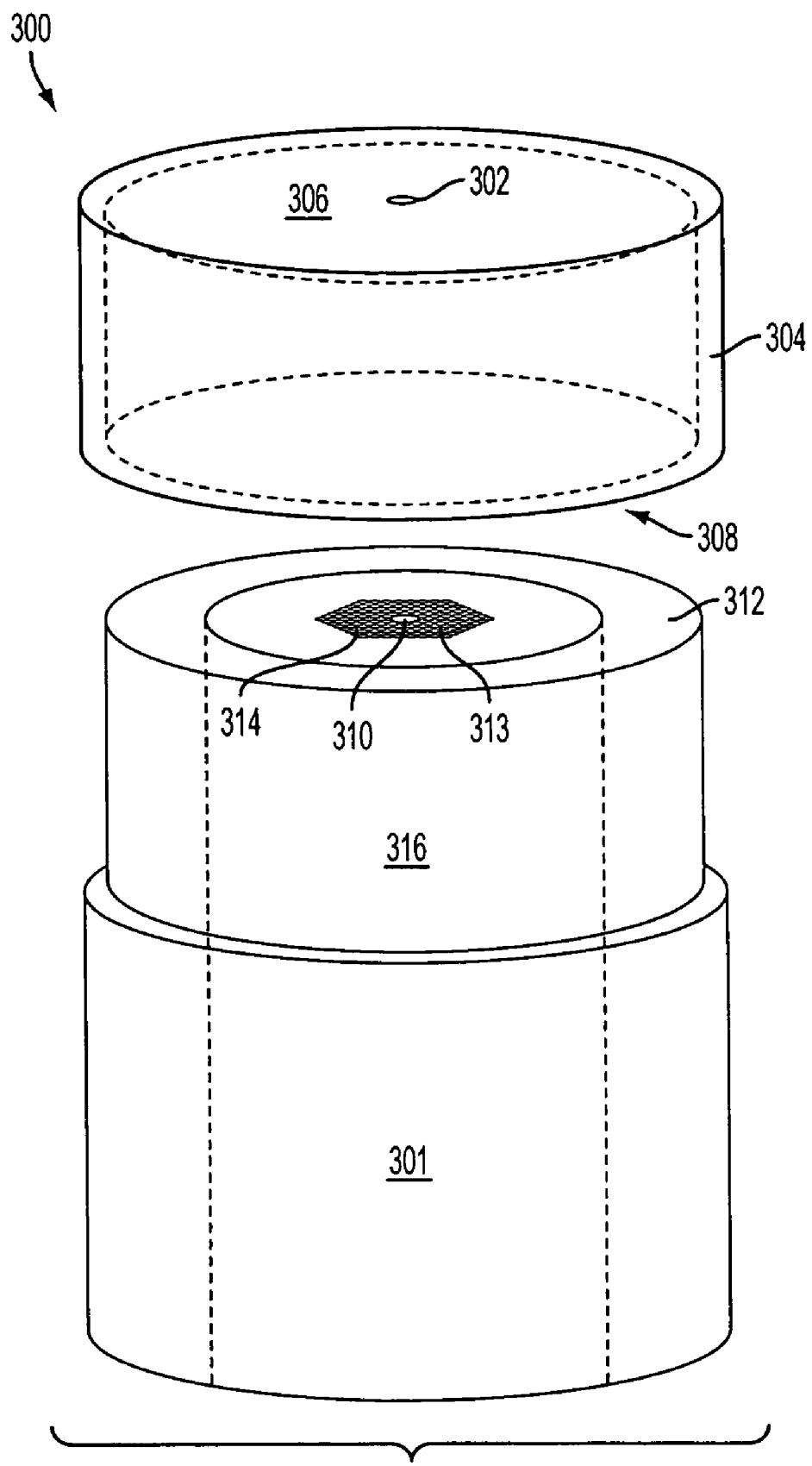
FIG. 3 shows a perspective view of the end cap design of the optical fiber termination structure.

In the embodiment shown in FIG. 3 of the fiber termination structure, the ferrule used is a standard type but there is an end cap machined to fit over the ferrule tip. In FIG. 3, end cap 300, which is a separate part of ferrule 301, has central opening 302, which is typically beveled, has skirt 304 which extends downwardly from upper surface 306. The skirt and the upper surface are typically perpendicular to each other and form open space 308 which fits over the end face 312, including the fiber and ferrule end face, to cover all of the fiber except the fiber core 310 which mates with opening 302 in the end cap 300. Fiber core 310 is surrounded by the microstructured region 313 which, in turn, is surrounded by the solid region 314. In order to keep the overall diameter of the ferrule 301 the same so that it fits into standard mating hardware, the tip of commercial-off-the-shelf ferrule 301 is machined on the outside at 316 so that the end cap 300 can be placed over the machined tip 316. This, of course, assumes that internal diameter of the end cap 300 matches the outside diameter of the ferrule end tip 316. The end cap 300 is typically glued to the ferrule along surface 316, if ceramic, or press-fitted thereon, if the ferrule is metallic. The opening 302, that matches the fiber core diameter, when operational, can be drilled with a bevel, to match numerical aperture of the fiber.

Figure 4A:
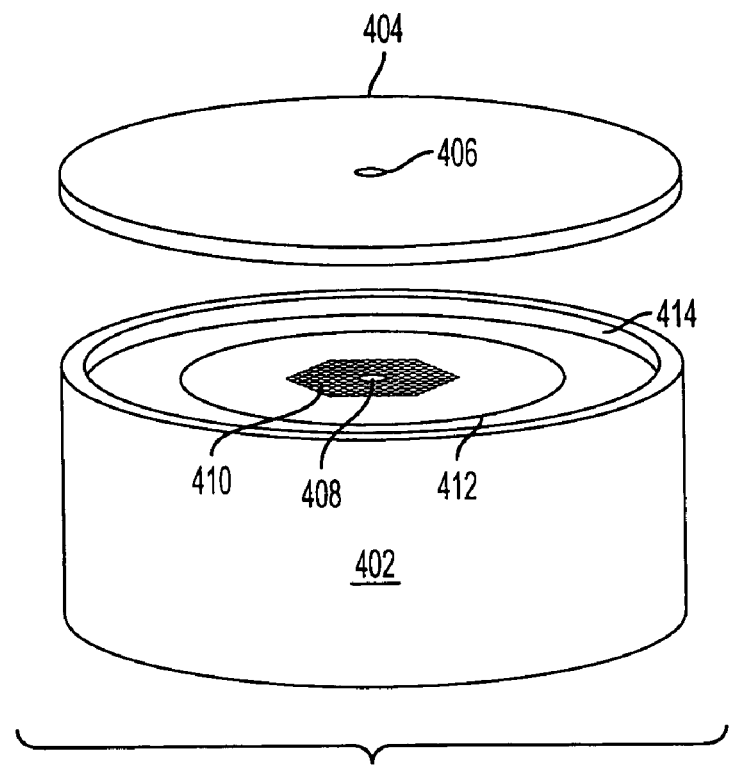
FIG. 4 shows a perspective view of the external washer design, with FIG. 4(a) showing inset design with a lip drilled into ferrule and with FIG. 4(b) showing another embodiment of the fiber termination structure wherein there is an exterior placement of a washer on end of ferrule.
Figure 4B:
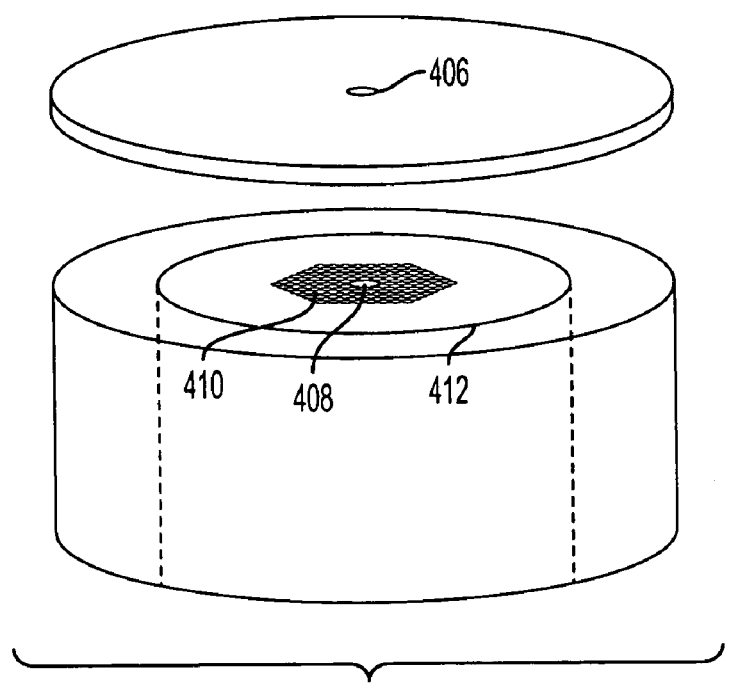

In another embodiment shown in FIG. 4, a standard ferrule 400 is used surrounding the optical fiber 402 but the ferrule disk or washer 404 is attached to the end of the ferrule with an adhesive, or in any other way. The disk has a typically centrally disposed opening 406 and generally beveled to exceed the NA of the fiber to match diameter of the fiber core 408 and should be as thin as practical. Drilling or in any other way providing opening 406 in the disk need to match the numerical aperture of the fiber. In a preferred embodiment, the fiber 402 has a fiber core 408 surrounded by a microstructured region 410 and a solid region 412 surrounding the microstructured region. The fiber regions are in direct contact with each other and extend longitudinally along the length of the fiber, as are the channels that characterize the microstructured region. To fit into standard mating hardware, the ferrule length is machined shorter prior to attaching the disk. As shown in FIG. 4(a), disk 404 is fitted on the end of ferrule 400 that has circumferential recess 414 drilled to match the disk 404, allowing for easier alignment of fiber core 408 and disk opening 404, when in operation. Alternatively, as shown in FIG. 4(b), the disk can be disposed directly on the end of the ferrule. The function of the disk is to block incidental optical rays of a highly energized optical signal propagating through the fiber core.

The fiber termination structures discussed herein particularly accommodate the constraints of the newer types of hollow core photonic bandgap types of hollow core and photonic crystal fiber types that necessitate prevention of laser light, or another highly energized optical signal, from impinging on the fiber microstructured region and subsequently causing damage to that region. However, the fiber termination structures disclosed herein will also be useful for high power terminations to standard fibers that can also be damaged if light hits the interface between fiber core and the microstructured region. Another item of note is that the fiber termination structures, with the exception of the embodiment illustrated in FIG. 2, are modifications of standard off-the-shelf fiber optic hardware of the various available types.

Additionally, all of the fiber termination structures disclosed herein can be modified by the addition of a window on end of the ferrule to transmit radiation at appropriate wavelengths. Such a window would seal interior of the fiber core to keep it free of dust, water, and other environmental contaminants.

Of the disclosed embodiments, the embodiment illustrated in FIG. 2 is entirely new and is commercially unavailable and is simplest in terms of fewest parts. If the embodiment of FIG. 2 is selected, it would be a custom structure to match properties of the fiber intended for it.

The new features in the embodiment of FIG. 3 are for the protection of the fiber using off-the-shelf hardware needing minimal machining to turn down the end of the ferrule to match the end cap. Fabrication of the embodiment of FIG. 3 is applicable to any herein-disclosed embodiment that is commercially available, and thus would not require a custom manufactured ferrule, as needed in the embodiment of FIG. 2. The end cap of the FIG. 3 embodiment could be made with a variety of hole sizes to match the fiber core sizes, but the ferrule to which it mates could have the same internal diameter hole size, assuming the fiber outside diameter is fixed.

Of all the embodiments disclosed herein, the embodiments of FIGS. 4(a) and 4(b) require the least amount of precision machining because they only require a length modification of the ferrule, or alternatively, a recessed region drilled to match the disk, prior to attachment of the disk. A variety of different types of disks could be machined, depending on the particular core sizes needed but the internal diameter of the ferrule could remain the same to match the outside diameter of the fiber.

While presently preferred embodiments have been shown of the novel fiber termination structures, and of the several modifications discussed, persons skilled in this art will readily appreciate that various additional changes and modification can be made without departing from the spirit of the invention as defined and differentiated by the following claims.

What is claimed:

1. A fiber termination apparatus including an optical fiber having a fiber core operable to transmit an optical signal through said fiber core, and a structured region around said fiber core, the structured region including multiple channels of smaller internal diameter than said fiber core and a solid region surrounding said structured region, said fiber termination apparatus comprising:
   a blocking structure disposed over an end of said optical fiber said blocking structure including an opening substantially aligned with said fiber core, said blocking structure disposed to block the optical signal from impinging on said structured region of said optical fiber; and
   a ferrule, with an opening therein for locating said fiber, at the end of said fiber and enveloping an extremity of said fiber which cooperates with said blocking structure to block the optical signal from impinging on said structured region of said optical fiber, wherein said ferrule includes a circumferential recess on inside outer edge of said ferrule with said blocking structure disposed in said recess.

2. The apparatus of claim 1, wherein said optical fiber includes an outer diameter in the approximate range of 80-1000 microns, said fiber core is at least 1 micron, and said structured region is approximately 5-50 microns thick, and said channels are arranged in courses with said channels disposed from each other a distance in the approximate range of 1-25 microns and the arrangement of said channels is such as to yield a photonic bandgap in an infrared beyond about 2 micron wavelength.

3. The apparatus of claim 1, wherein said fiber core is hollow and is circular in cross-section and has a diameter of approximately 2-200 microns, thickness of said solid region is approximately 5-500 microns, there are four courses of said channels in said structured region around said core and said channels are approximately 1-25 microns in diameter.

4. The apparatus of claim 1, wherein said channels are approximately 1-25 microns in diameter and wherein said structured region is non-circular.

5. The apparatus of claim 1, wherein said core is solid and wherein said channels in said structured region are arranged in a hexagonal pattern, the material of said optical fiber is chalcogenide glass and operable to transmit said optical signal including a power density of below about 6 GW/cm$^2$.

6. The apparatus of claim 1, wherein said solid region is a circumferential region around and in contact with said structured region and said structured region has air fill fraction of approximately 40-70%.

7. The apparatus of claim 1, wherein said ferrule and said blocking structure comprising a material selected from the group consisting of ceramic, metal, plastic and mixtures thereof.

8. The apparatus of claim 1, further comprising a window provided in said blocking structure.

9. The apparatus of claim 1, wherein said blocking structure comprises an endcap device including a window disposed thereon.

10. The apparatus of claim 1, wherein said blocking structure comprises a disk device including a window disposed thereon.

11. The apparatus of claim 1, wherein said optical fiber includes a photonic band gap fiber, and a photonic crystal fiber.

12. The apparatus of claim 1, wherein said opening of said blocking structure comprises a beveled opening.

13. A fiber termination apparatus including an optical fiber having a fiber core operable to transmit an optical signal through said fiber core, and a structured region around said fiber core, the structured region including multiple channels of smaller internal diameter than said fiber core and a solid region surrounding said structured region, said fiber termination apparatus comprising:
   a blocking structure disposed over an end of said optical fiber, said blocking structure including an opening substantially aligned with said fiber core, said blocking structure disposed to block all the optical signal initially incident upon said blocking structure from impinging on said structured region of said optical fiber.

14. The apparatus of claim 13, further comprising
   a ferrule, with an opening therein for locating said fiber, at the end of said fiber and enveloping an extremity of said fiber which cooperates with said blocking structure to block the optical signal from impinging on said structured region of said optical fiber.

15. The apparatus of claim 14 wherein said ferrule and said blocking structure comprising a material selected from the group consisting of ceramic, metal, plastic and mixtures thereof.

16. The apparatus of claim 14 wherein said ferrule includes a circumferential recess on inside outer edge of said ferrule with said blocking structure disposed in said recess.

17. The apparatus of claim 13, wherein said optical fiber includes an outer diameter in the approximate range of 80-1000 microns, said fiber core is at least 1 micron and said structured region is approximately 5-50 microns thick, and said channels are arranged in courses with said channels disposed from each other a distance in the approximate range of 1-25 microns and the arrangement of said channels is such as to yield a photonic bandgap in an infrared beyond about 2 micron wavelength.

18. The apparatus of claim 13, wherein said fiber core is hollow and is circular in cross-section and has a diameter of approximately 2-200 microns, thickness of said solid region is approximately 5-500 microns, there are four courses of said channels in said structured region around said core and said channels are approximately 1-25 microns in diameter.

19. The apparatus of claim 13, wherein said channels are approximately 1-25 microns in diameter and wherein said structured region is non-circular.

20. The apparatus of claim 13, wherein said core is solid and wherein said channels in said structured region are arranged in a hexagonal pattern, the material of said optical fiber is chalcogenide glass and operable to transmit said optical signal including a power density of below about 6 GW/cm$^2$.

21. The apparatus of claim 13 wherein said solid region is a circumferential region around and in contact with said structured region and said structured region has air fill fraction of approximately 40-70%.

22. A fiber termination apparatus including an optical fiber having a fiber core, said optical fiber operable to transmit an optical signal through said fiber core and a structured region around said fiber core for directing the optical signal into the core, the structured region including multiple channels of smaller internal diameter than said fiber core, and a solid region surrounding said structured region, said fiber termination apparatus comprising;

a blocking structure disposed over the end of said ferrule with an opening substantially aligning with said fiber core, said blocking structure disposed to block all said optical signal initially incident upon said blocking structure from impinging on said structured region; and a ferrule, with an opening therein for locating said fiber, at the end of said fiber enveloping an extremity of said fiber which cooperates with said blocking structure to block the optical signal from impinging on said structured region of said fiber.

* * * * *